(12) United States Patent
Ozawa et al.

(10) Patent No.: US 7,642,322 B2
(45) Date of Patent: Jan. 5, 2010

(54) FUNCTIONALIZED HIGH CIS-1,4-POLYBUTADIENE PREPARED USING NOVEL FUNCTIONALIZING AGENTS

(75) Inventors: Yoichi Ozawa, Tokyo (JP); H. Jerrold Miller, Savannah, GA (US); Koji Masaki, Hagashimurayama (JP); Koichi Morita, Higashiyamato (JP); Tatsuo Fujimaki, Higashimurayama (JP); Tetsuya Omura, Kodaira (JP); Takuo Sone, Tokyo (JP); Iwakazu Hattori, Tokyo (JP)

(73) Assignee: Bridgestone Corporation (JP)

( * ) Notice: Subject to any disclaimer, the term of this patent is extended or adjusted under 35 U.S.C. 154(b) by 543 days.

(21) Appl. No.: 11/216,559

(22) Filed: Aug. 31, 2005

(65) Prior Publication Data

US 2006/0004131 A1 Jan. 5, 2006

Related U.S. Application Data

(63) Continuation of application No. 10/381,829, filed as application No. PCT/US00/30969 on Nov. 10, 2000, now abandoned.

(51) Int. Cl.
*C08C 19/34* (2006.01)
*C08C 19/22* (2006.01)

(52) U.S. Cl. .................... 525/383; 525/377; 525/105

(58) Field of Classification Search ............... 525/342, 525/377, 383, 105
See application file for complete search history.

(56) References Cited

U.S. PATENT DOCUMENTS

| | | | |
|---|---|---|---|
| 1,223,396 A | 4/1917 | Karlsson | |
| 2,227,957 A | 1/1941 | Brasse | |
| 3,297,667 A | 1/1967 | Von Dohlen et al. | 260/82.1 |
| 3,541,063 A | 11/1970 | Throckmorton et al. | 260/82.1 |
| 3,794,604 A | 2/1974 | Throckmorton et al. | 252/431 |
| 4,185,042 A | 1/1980 | Verkouw | 525/332 |
| 4,461,883 A | 7/1984 | Takeuchi et al. | 526/139 |
| 4,751,275 A | 6/1988 | Witte et al. | 526/139 |
| 4,791,174 A | 12/1988 | Bronstert et al. | |
| 4,906,706 A | 3/1990 | Hattori et al. | 525/343 |
| 4,990,573 A | 2/1991 | Andreussi et al. | 525/332.3 |
| 5,064,910 A | 11/1991 | Hattori et al. | 525/359.1 |
| 5,066,729 A | 11/1991 | Stayer et al. | 525/332 |
| 5,109,907 A | 5/1992 | Stayer et al. | 152/654 |
| 5,227,431 A | 7/1993 | Lawson et al. | 525/237 |
| 5,310,798 A | 5/1994 | Lawson et al. | 525/102 |
| 5,508,333 A | 4/1996 | Shimizu | 524/424 |
| 5,567,784 A | 10/1996 | Wieder et al. | 526/164 |
| 5,844,050 A * | 12/1998 | Fukahori et al. | 525/351 |
| 5,866,171 A | 2/1999 | Kata | 425/46 |
| 5,866,650 A | 2/1999 | Lawson et al. | 524/572 |
| 5,876,527 A | 3/1999 | Tsuruta et al. | 152/541 |
| 5,916,961 A | 6/1999 | Hergenrother et al. | 524/572 |
| 5,931,211 A | 8/1999 | Tamura | 152/209.5 |
| 5,971,046 A | 10/1999 | Koch et al. | 152/152.1 |
| 6,117,927 A | 9/2000 | Toba et al. | 524/261 |
| 6,172,160 B1 | 1/2001 | Nakamura et al. | |
| 6,194,505 B1 | 2/2001 | Sone et al. | 524/432 |
| 6,197,888 B1 | 3/2001 | Luo | 525/247 |
| 6,255,416 B1 | 7/2001 | Sone et al. | 526/153 |
| 6,291,591 B1 | 9/2001 | Luo | 525/191 |
| 6,303,692 B1 | 10/2001 | Luo | 525/191 |
| 6,699,813 B2 | 3/2004 | Luo et al. | 502/119 |
| 6,759,497 B2 | 7/2004 | Grun et al. | |
| 6,838,526 B1 | 1/2005 | Sone et al. | |
| 6,897,270 B2 | 5/2005 | Ozawa et al. | 526/88 |
| 6,977,281 B1 | 12/2005 | Ozawa et al. | 525/377 |
| 6,992,147 B1 | 1/2006 | Ozawa et al. | 525/342 |
| 7,008,899 B2 | 3/2006 | Luo et al. | 502/131 |
| 7,094,849 B2 | 8/2006 | Luo et al. | 526/164 |
| 7,351,776 B2 | 4/2008 | Tartamella et al. | |
| 2004/0147694 A1 | 7/2004 | Sone et al. | 526/164 |
| 2006/0025539 A1 | 2/2006 | Ozawa et al. | 525/377 |
| 2006/0030677 A1 | 2/2006 | Ozawa et al. | 525/342 |
| 2007/0149717 A1 | 6/2007 | Luo et al. | |

FOREIGN PATENT DOCUMENTS

| | | |
|---|---|---|
| DE | 138 070 | 10/1979 |
| EP | 05-59103 A | 9/1993 |
| EP | 0 767 179 | 4/1997 |
| EP | 0 863 165 | 9/1998 |
| EP | 0 894 825 | 2/1999 |
| EP | 1 099 711 | 11/1999 |
| GB | 835752 | 7/1956 |
| JP | 05-051406 A | 3/1993 |
| JP | 10-306113 A | 11/1998 |
| JP | 11-035633 A | 2/1999 |

(Continued)

OTHER PUBLICATIONS

D.J. Wilson, Journal of Polymer Science, Part A, Polymer Chemistry, 1995, vol. 33, pp. 2505-2513.

(Continued)

*Primary Examiner*—Ling-Siu Choi
(74) *Attorney, Agent, or Firm*—Meredith E. Hooker; Arthur Reginelli

(57) ABSTRACT

A functionalized polymer prepared by a process comprising the steps of preparing a pseudo-living polymer by polymerizing conjugated monomer with a lanthanide-based catalyst, and reacting the pseudo-living polymer with a functionalizing agent defined by the formula (I)

$$A\text{-}R^1\text{-}Z \qquad (I)$$

where $R^1$ is a divalent bond or divalent organic group comprising from 0 to about 20 carbon atoms, A is a substituent that will undergo an addition reaction with a pseudo-living polymer, and Z is a substituent that will react or interact with silica or carbon black reinforcing fillers, with the proviso that A, $R^1$, and Z are substituents that will not protonate a pseudo-living polymer.

16 Claims, No Drawings

FOREIGN PATENT DOCUMENTS

| | | |
|---|---|---|
| WO | 95/04090 | 9/1995 |
| WO | 01/34658 | 11/2000 |
| WO | 01/34659 | 11/2000 |
| WO | 02/38615 A1 | 5/2002 |

OTHER PUBLICATIONS

R.P. Quirk, A.M. Kells, Poymer International, 2002 vol. 49, pp. 751-756.

Z. Shen, J. Ouyang, F. Wang, Z. Hu, F. Yu, and B. Qian, Journal of Polymer Science: Polymer Chemistry Edition, 1980, vol. 18, pp. 3345-3357.

H.L. Hsieh, H.C. Yeh, Rubber Chemistry and Technology, 1985, vol. 58, pp. 117-145.

"Chemical Modification of Neodymium High cis-1,4-Polybutadiene with Styreneoxide" by Hattori et al., J. Elastomers and Plastics, Issue 23, 135, 1991.

"Functionalization with Styreneoxide" by Hattori et al., Polym. Adv. Techol., Issue 4, 450 1993.

* cited by examiner

FUNCTIONALIZED HIGH CIS-1,4-POLYBUTADIENE PREPARED USING NOVEL FUNCTIONALIZING AGENTS

This application is a continuation of application Ser. No. 10/381,829, filed Sep. 22, 2003, now abandoned which gains priority from International Application No. PCT/US00/30969, FILED Nov. 10, 2000.

FIELD OF THE INVENTION

This invention relates to functionalizing agents, functionalized polymers prepared by contacting at least one functionalizing agent with a pseudo-living polymer, and processes for functionalizing these polymers. The functionalizing agents are generally defined by the formula $A-R^1-Z$, where A is a substituent that will undergo an addition reaction with a pseudo-living polymer, $R^1$ is a divalent organic group, and Z is a substituent that will react or interact with organic or inorganic fillers.

BACKGROUND OF THE INVENTION

Conjugated diene polymers are commonly used in the rubber industry. These polymers are often prepared by using coordination-catalysis techniques because the microstructure of the resulting polymer can be controlled. Polybutadiene having greater than 90 percent of its units in the 1,4-cis configuration can be produced with a coordination catalyst system that includes a nickel, cobalt, or titanium compound, an alkylating agent, and a halogen source. Polymers having this microstructure have a low glass transition temperature ($T_g$), which provides good low-temperature properties. Also, high 1,4-cis polymers have excellent wear resistance and mechanical properties such as reduced cut growth.

The tire industry has been challenged to design tires that have improved rolling resistance, which contributes to better fuel efficiency. Attempts to improve rolling resistance have included alternate tire designs and the use of rubber that has less hysteresis loss. Also, there has a been a trend toward the use of silica as a reinforcing filler. Polymers that interact with the reinforcing fillers of tires have demonstrated less hysteresis loss.

Functionalized polymers prepared with anionic polymerization techniques have demonstrated lower hysteresis loss. They can be functionalized both at initiation and termination. Polybutadiene has been produced by initiating polymerization of 1,3-butadiene with functionalized initiators to provide polymers that have a greater affinity toward carbon black or silica filler. Anionically polymerized polymers have also been terminated with functionalized terminators to provide polymers that have a greater affinity toward carbon black or silica fillers. Unfortunately because anionic polymerization does not provide strict control over the polymer microstructure, high 1,4-cis polymers are not obtained.

Coordination catalysis limits the ability to functionalize the resulting polymers because they operate by chemical mechanisms that involve the interaction of several chemical constituents, and often also involve self-termination reactions. As a result, the reaction conditions required to achieve functionalization are difficult to obtain.

Terminating agents, such as organo metal halides, heterocumulene compounds, three-membered heterocyclic compounds, and certain other halogen containing compounds, will react with polymers prepared with a lanthanide-based catalyst system. The resulting functionalized polymers, however, do not have a useful enough affinity toward either silica or carbon black fillers.

Therefore, there is a need in the art to provide functionalizing agents that will react with polymers prepared with coordination catalysts to yield functionalized polymers having a high cis microstructure and an affinity toward carbon black and silica.

SUMMARY OF INVENTION

In general the present invention provides a functionalized polymer prepared by a process comprising the steps of preparing a pseudo-living polymer by polymerizing conjugated monomer with a lanthanide-based catalyst, and reacting the pseudo-living polymer with a functionalizing agent defined by the formula (I)

$$A-R^1-Z \qquad (I)$$

where $R^1$ is a divalent bond or divalent organic group comprising from 0 to about 20 carbon atoms, A is a substituent that will undergo an addition reaction with a pseudo-living polymer, and Z is a substituent that will react or interact with silica or carbon black reinforcing fillers, with the proviso that A, $R^1$, and Z are substituents that will not protonate a pseudo-living polymer.

The present invention also includes a method for preparing a functionalized polymer comprising the steps of preparing a pseudo-living polymer by polymerizing conjugated diene monomer with a lanthanide-based catalyst, and reacting the pseudo-living polymer with at least one functionalizing agent defined by the formula (I)

$$A-R^1-Z \qquad (I)$$

where $R^1$ is a divalent bond or divalent organic group, comprising from 0 to about 20 carbon atoms, A is a substituent that will undergo an addition reaction with a pseudo-living polymer, and Z is a substituent that will react or interact with silica or carbon black reinforcing fillers, with the proviso that A, $R^1$, and Z are substituents that will not protonate a pseudo-living polymer.

The present invention further includes a vulcanizable composition of matter comprising a rubber component comprising a functionalized polymer prepared by a process comprising the steps of preparing a pseudo-living polymer by polymerizing conjugated monomer with a lanthanide-based catalyst, and reacting the pseudo-living polymer with a functionalizing agent defined by the formula (I)

$$A-R^1-Z \qquad (I)$$

where A is a substituent that will undergo an addition reaction with a pseudo-living polymer, $R^1$ is a divalent bond or divalent organic group, and Z is a substituent that will react or interact with silica or carbon black reinforcing fillers, with the proviso that A, $R^1$, and Z are substituents that will not protonate a pseudo-living polymer, where said polymer has a cis microstructure that is greater that about 90%, a 1,2- or 3,4-unit content that is less than about 2%, and a molecular weight distribution that is less than about 4, and a reinforcing filler including an inorganic filler.

Advantageously, the functionalizing agents of the present invention will react with a pseudo-living polymer to form an end-functionalized polymer, while not protonating the pseudo-living polymer. This reactivity, among other things, allows functionalized pseudo-living polymers to be prepared by a process comprising contacting one or more functionalizing agents, including mixtures thereof, with a pseudo-living polymer. Further, the functionalized polymer so formed contains a substituent which will react or interact with fillers and thereby reduce hysteresis loss. Furthermore, the process of the present invention can be used to functionalize high cis-1,4-polymers, resulting in functionalized polymers with low glass transition temperatures and good low-temperature properties. In addition, the functionalized polymers of the present invention can advantageously be used in the manufacture of various tire components including, but not limited to, tire treads, side walls, subtreads, and bead fillers.

DETAILED DESCRIPTION OF ILLUSTRATIVE EMBODIMENTS

The polymers that are functionalized are prepared from lanthanide-based coordination catalyst systems. These polymers are preferably characterized in that greater than about 85% of the polymer is in the cis microstructure, less than about 3% of the polymer is in the 1, 2 or 3,4 microstructure, and molecular weight distribution of the polymer is less than about 4. Because these polymers have been found to demonstrate some living characteristics, they may be called pseudo-living polymers within this specification.

This invention is not limited to functionalizing a polymer prepared from any particular lanthanide-based catalyst. One useful catalyst includes a lanthanide compound, an alkylating agent, and a source of halogen. The lanthanide compound can include neodymium (Nd) carboxylates including Nd neodecanoate. Also, the lanthanide compound can include the reaction product of a Nd, carboxylate and a Lewis base such as acetylacetone. The alkylating agents can generally be defined by the formula $AlR_3$, where each R, which may the same or different, is hydrogen, a hydrocarbyl group, or an alkyl aluminoxy group, with the proviso that at least one R is a hydrocarbyl group. Examples of these alkylating agents include, but are not limited to, trialkyl aluminum, dialkyl aluminum hydride, alkyl aluminum dihydride, and mixtures thereof. Examples of alkylating agents where R is an alkyl aluminoxy group include methyl aluminoxanes. Sources of halogen can include organoaluminum chloride compounds. Catalyst systems that generally include lanthanide compounds and alkylating agents definable by the formula $AlR_3$ are disclosed in U.S. Pat. Nos. 3,297,667, 3,541,063, and 3,794,604, which are incorporated herein by reference.

One particularly preferred catalyst includes (a) the reaction product of Nd carboxylate and acetylacetone, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in U.S. Pat. No. 4,461,883, which is incorporated herein by reference. Another preferred catalyst includes (a) Nd neodecanoate, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in Can. Pat. No. 1,223,396, which is incorporated herein by reference.

Typically, from about 0.0001 to about 1.0 mmol of lanthanide metal are employed per 100 grams of monomer. More preferably, from about 0.001 to about 0.75, and even more preferably from about 0.005 to about 0.5 mmol of lanthanide metal per 100 grams of monomer are employed. The ratio of alkylating agent to lanthanide metal is from about 1:1 to about 1:500, more preferably from about 3:1 to about 250:1, and even more preferably from about 5:1 to about 200:1. The ratio of halogen source to lanthanide metal is from about 0.1:1 to about 30:1, more preferably from about 0.2:1 to about 15:1, and even more preferably from about 1:1 to about 10:1.

Monomers that are polymerized by the lanthanide-based catalysts are conjugated diene monomers that include, but are not limited to, 1,3-butadiene, isoprene, 1,3-pentadiene, 2,3-dimethyl-1,3-butadiene, and myrcene. 1,3-butadiene is most preferred. These conjugated dienes may be used either alone or in combination. If desired, a small amount of monomer other than conjugated dienes can be added. These other monomers include, but are not limited to, aromatic vinyl compounds such as styrene. The amount of the copolymerizable monomer is not limited, but is usually less than 10 percent by weight (pbw) preferably less than 5 pbw, and even more preferably less than about 3 pbw of the entire polymer.

Useful functionalizing agents include those generally defined by the formula (I)

$$A\text{-}R^1\text{-}Z \qquad\qquad (I)$$

where A is a substituent that will undergo an addition reaction with a pseudo-living polymer, $R^1$ is a divalent bond or divalent organic group, and Z is a substituent that will react or interact with organic or inorganic filler, with the proviso that A, $R^1$, and Z are substituents that will not protonate a pseudo-living polymer. Substituents that will not protonate a pseudo-living polymer refer to those substituents that will not donate a proton to the polymer by way of a protolysis reaction.

Substituents that will undergo an addition reaction with a pseudo-living polymer, and are thus useful as substituent A of the above formula, include ketone, aldehyde, amide, ester and imidazolidinone groups, isocyanate, and isothiocyanate groups. The amide groups include isocyanulate groups.

Substituents that will react or interact with organic or inorganic filler, and are thus useful as substituent Z of the above formula include N,N-disubstituted aminophenyl, imine, cyclic amino, epoxy, isocyanate, isothiocyanate, and amide groups.

A divalent organic group includes a hydrocarbylene group that contains from 0 to about 20 carbon atoms. More preferably, the hydrocarbylene group contains from about 1 to about 10 carbon atoms, and even more preferably from about 2 to about 8 carbon atoms. In the case where the hydrocarbylene group contains 0 carbon atoms, the group simply represents a single bond between the group Z and the group A. Suitable hydrocarbylene groups include, but are not limited to, alkylene, cycloalkylene, substituted alkylene, substituted cycloalkylene, alkenylene, cycloalkenylene, substituted alkenylene, substituted cycloakenylene, arylene, and substituted arylene. The term "substituted" refers to an organic group, such as a hydrocarbyl group, that replaces a hydrogen atom attached to a carbon within the group. The hydrocarbylene group may contain hetero atoms such as nitrogen (N), oxygen (O), sulfur (S), phosphorus (P), and silicon (Si). Hydrocarbylene groups that include O may be referred to as oxo-hydrocarbylene groups, or, where they include N, as aza-hydrocarbyl-hydrocarbylene groups.

Some specific examples of hydrocarbylene groups include methylene, ethylene, 1,3-propylene, 1,2-propylene, 1,4-butylene, 1,4-(2-methyl)butylene, 1,5-pentylene, cyclopentylene, and phenylene.

In one embodiment, where A contains a ketone or aldehyde group, the functionalizing agents can be defined by the formula (II)

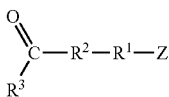
(II)

where $R^1$ and Z are as defined above, $R^2$ is a divalent organic group or a trivalent organic group in the case where $R^2$ combines with $R^3$ to form a cyclic group, and $R^3$ is a hydrogen atom, a monovalent organic group, or, in the case where $R^3$ combines with $R^2$, $R^3$ may be a divalent organic group.

A monovalent organic group includes hydrocarbyl groups that contain from 1 to about 20 carbon atoms. More preferably, these groups will include from about 2 to about 10 carbon atoms, and even more preferably from about 3 to about 8 carbon atoms. These hydrocarbyl groups can include, but are not limited to, alkyl, cycloalkyl, substituted alkyl, substituted cycloalkyl, alkenyl, cycloalkenyl, substituted alkenyl, substituted cycloalkenyl, aryl, substituted aryl, allyl, aralkyl, alkaryl, and alkynyl groups, and may contain hetero atoms such as N, O, S, P, and Si. Where these hydrocarbyl groups include O, they may be referred to as oxo-, hydrocarbyl groups, or where they include N, they may be referred to as aza-hydrocarbyl-hydrocarbyl groups.

Specific examples of hydrocarbyl groups include methyl, ethyl, propyl, isopropyl, butyl, 2-methylbutyl, pentyl, hexyl, cyclohexyl, heptyl, octyl, cyclo-octyl, 2-ethylhexyl, and 2-propylhexyl.

Where $R^3$ is an organic group, the substituent A contains a ketone group. Non-limiting examples of ketone groups include benzophenone, and acetophenone. Non-limiting examples of ketone-containing functionalizing agents definable by the formula (II) include 4,4'-bis(N,N-dimethylamino) benzophenone, 4,4'-bis(N,N-diethylamino)benzophenone, 4-(N,N-dimethylamino)benzophenone, 4-(N,N-diethylamino)benzophenone, (4-N,N-dimethylaminophenyl)methyl ethyl ketone, 4,4'-bis(1-hexamethyleneiminomethyl) benzophenone, 4,4'-bis(1-pyrolidinomethyl) benzophenone, 4-(1-hexamethyleneiminomethyl) benzophenone, 4-(1-pyrolidinomethyl) benzophenone, and (4-(1-hexamethyleneimino)phenyl)methyl ethyl ketone.

Where $R^3$ is a hydrogen atom, the substituent A contains an aldehyde group. A non-limiting example of a reactive aldehyde group includes benzaldehyde group. Non-limiting examples of aldehyde-containing functionalizing agents include 4-(N,N-dimethylamino)benzaldehyde, 4-(N,N-diethylamino)benzaldehyde, 4-(1-hexamethyleneiminomethyl) benzaldehyde, and 4-(1-pyrolidinomethyl) benzaldehyde.

One particularly preferred class of ketone-containing functionalizing agents include those compounds where Z is an N,N-disubstituted aminophenyl group. These functionalizing agents have surprisingly been found to be extremely useful for functionalizing pseudo-living polymers that have been prepared with lanthanide-based catalyst systems that employ trialkyl aluminum, dialkyl aluminum hydride, alkyl aluminum hydride, or alkyl aluminoxane alkylating agents or any combination of these, and a source of halide. This finding is advantageous because the pseudo-living polymers may be prepared in the absence of phosphorus-containing compounds, and without any particular need to prepare the catalyst by a specific process.

One particularly preferred class of aldehyde-containing functionalizing agents include those compounds where Z is an N,N-disubstituted aminophenyl group. These functionalizing agents have surprisingly been found to be extremely useful for functionalizing pseudo-living polymers that have been prepared with lanthanide-based catalyst systems that employ trialkyl aluminum, dialkyl aluminum hydride, or alkyl aluminum hydride, or any combination of these, and a source of halide. This finding is advantageous because the pseudo-living polymers may be prepared in the absence of phosphorus-containing compounds, in the absence of alkyl aluminoxane compounds, which are expensive, and without any particular need to prepare the catalyst by a specific process.

In another embodiment, where A contains an ester group, the functionalizing agents can be defined by the formulas (III) and (IV)

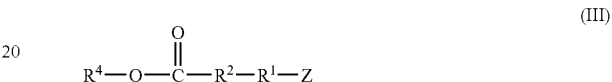
(III)

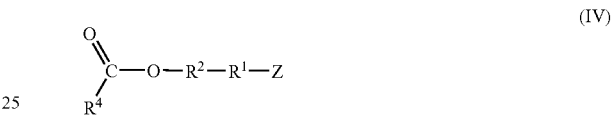
(IV)

where $R^1$, $R^2$, and Z are as defined above, and $R^4$ is a monovalent organic group, or, in the case where $R^2$ or $R^1$ combines with $R^4$ to form a cyclic group, $R^4$ may be a divalent organic group and $R^2$ may be a trivalent organic group.

Non-limiting examples of ester groups include α,β-unsaturated esters, methacrylic acid esters, and acrylic acid esters.

The preferred ester-containing compounds include filler-interactive groups, i.e., Z, that include N,N-disubstituted aminophenyl, imine, cyclic amino, isocyanate, isothiocyanate, and amide groups. Non-limiting examples of these ester-containing functionalizing agents include tert-butyl 4-(N,N-dimethylamino)benzoate, tert-butyl 4-(N,N-diethylamino) benzoate, bis (4-(N,N-diethylamino)benzyl maleate, tert-butyl 4-(1-hexamethyleneiminomethyl) benzoate, bis (4-(1-hexamethyleneiminomethyl)benzyl) maleate, tert-butyl 4-isocyanatobenzoate, and bis (4-isocyanatobenzyl) maleate.

In another embodiment, where A contains an isocyanate or isothiocyanate group, the functionalizing agents can be defined by the formula (V)

(V)

where $R^1$, $R^2$, and Z are as defined above, and where e is O or S.

Non-limiting examples of isocyanate groups include (2-isocyanato) ethyl, (3-isocyanato)propyl, (4-isocyanato) butyl, and (5-isocyanato)pentyl. Examples of isothiocyanate groups include the isothiocyanato equivalents of the foregoing groups.

The preferred isocyanate or isothiocyanate-containing groups include filler-interactive groups, i.e., Z, that include N,N-disubstituted aminophenyl, cyclic amino, imine and amide groups. A non-limiting example of an isocyanate-containing functionalizing agent definable by the formula (V) includes 4-(N,N-diethylamino)phenyl-4'-isocyantophenylmethane.

In another embodiment, where A contains an amide group, functionalizing agents of the present invention can be defined by the formulas (VI) and (VII)

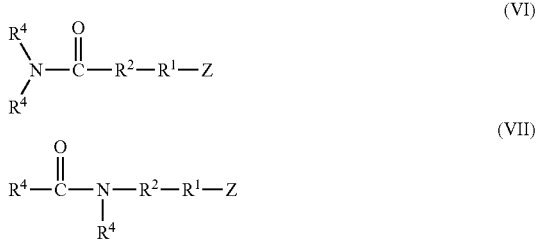

(VI)

(VII)

where $R^1$, $R^2$, $Z$, and each $R^4$, which may be the same or different, are as defined above, and where $R^2$ may combine with any $R^4$, or two $R^4$ groups may combine, to form a cyclic group. In this formula and all others in this specification, R groups are defined by the types of groups they may contain. It should be understood that, wherever two or more R groups of the same general type, i.e., $R^4$, appear in a formula, those R groups may be the same or different, within their general definition.

Non-limiting examples of reactive amide groups include N-alkyl-isocyanulates, 3-(N,N-dialkylamido) propyl, trihydrocarbyl isocyanulate, 3-(N,N-dihydrocarbylamido)alkyl, N-hydrocarbylcaprolactam, and N-hydrocarbylpyrrolidone groups.

One particularly preferred class of amide-containing functionalizing agents include those compounds where Z is an amide. These functionalizing agents have surprisingly been found to be extremely useful for functionalizing pseudo-living polymers that have been prepared with lanthanide-based catalyst systems that employ trialkyl aluminum, dialkyl aluminum hydride, alkyl aluminum hydride, or alkyl aluminoxane alkylating agents or any combination of these, and a source of halide. This finding is advantageous because the pseudo-living polymers may be prepared in the absence of phosphorus-containing compounds, and without any particular need to prepare the catalyst by a specific process.

Some specific non-limiting examples of amide-containing functionalizing agents definable by the formulas (VI) or (VII) include N-methylpyrrolidone, N-ethylpyrrolidone, and N′,N-dimethylimidazolidinone (DMI).

The functionalized polymers are prepared by contacting one or more of the foregoing functionalizing agents, including mixtures thereof, with a pseudo-living polymer. If a solvent is employed, it is preferable to employ a solvent in which both the pseudo-living polymer and the functionalizing agent are soluble, or in which they may both be suspended. Preferably, this contacting takes place at a temperature of less than 160° C., and more preferably at a temperature from about 20° C. to about 100° C. Further, the reaction time is preferably from about 0.1 to about 10 hours, and more preferably from about 0.2 to about 5 hours.

The amount of functionalizing agent used can vary. Preferably, from about 0.01 to about 200 moles of functionalizing agent per mole of lanthanide, and more preferably, from about 0.1 to about 150 moles per mole of lanthanide are employed.

The reaction between the pseudo-living polymer and the functionalizing agent is quenched by using reagents such as, but not limited to, isopropyl alcohol, methanol, and water. Stabilizers, such as 2,6-di-tert-butyl-4-methylphenol (BHT), can be added during or after quenching.

Before quenching the resulting polymer, however, certain reactive compounds can be added to provide additional functionality to the polymer. These reactive compounds include those that will undergo addition reactions with metal alkoxides or metal amides. Addition of a protic quenching agent is believed to remove the metal via a substitution reaction and thereby leave a lanthanide or aluminum amino group at the polymer chain end. A reaction between the metal amide and the metal amide-reactive compound before quenching is believed to provide additional functionality.

The polymer product can be recovered by using any technique that is commonly employed in the art. For example, the polymer product can be coagulated in a hindered solvent such as isopropyl alcohol, and then dried in a hot air oven or hot mill. Alternatively, the polymer product can be recovered by steam desolventization and successive hot air drying or drying on a hot mill or the like. A processing oil can be added prior to finishing.

The resulting functionalized polymer can be represented by the formula (XV)

(XV)

where $R^1$ and $R^3$ are as defined above, and A* is the residue of the imino portion of the functionalizing agent that has undergone an addition reaction with a pseudo-living polymer, and is polymer having a cis microstructure that is greater than about 85%, a 1,2- or 3,4-unit content that is less than about 3%, and a molecular weight distribution that is less than about 5. More preferably, the polymer has a cis microstructure that is greater than about 90%, a 1,2- or 3,4-unit content that is less than about 2%, and a molecular weight distribution that is less than about 4.

Polymers carrying alkoxysilane functionality may couple via a condensation reaction. For example, polymers represented by the formula (XV) may condense to form a coupled polymer that is represented by the following formula (XVI)

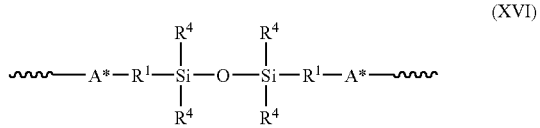

(XVI)

where A*, $R^1$ and $R^4$ are as defined above.

Reference to the functionalized polymers will likewise include the condensation products thereof. In the event that any $R^4$ is $OR^5$, it may likewise couple with another functionalized polymer. Advantageously, the coupling of functionalized polymers where Z is a silane group improves the cold flow resistance of the polymers.

The functionalized polymers of this invention can advantageously be used in the manufacture of various tire components including, but not limited to, tire treads, side walls, subtreads, and bead fillers. They can be used as all or part of the elastomeric component of a tire stock. In one embodiment, the functionalized polymers comprise greater than about 10 percent by weight (pbw), more preferably, greater than about 20 pbw, and even more preferably greater than about 30 pbw, of the elastomeric component of the tire stock. Addition of the functionalized polymers to a tire stock does not alter the type or amount of other ingredients typically included within these vulcanizable compositions of matter. Accordingly, practice of this invention is not limited to any particular vulcanizable composition of matter or tire compounding stock.

Typically, tire stocks include an elastomeric component that is blended with reinforcing fillers and at least one vulcanizing agent. Accelerators, oils, waxes, fatty acids and processing aids are often included. Vulcanizable compositions of matter containing synthetic rubbers typically include antidegradants, processing oils, zinc oxide, optional tackifying resins, optional reinforcing resins, optional peptizers, and optional scorch inhibiting agents.

The functionalized polymers of this invention may be used in conjunction with other rubbers to form the elastomeric component of a tire stock. These other rubbers may include natural rubber, synthetic rubber, or both. Examples of synthetic rubber include synthetic poly(isoprene), poly(styrene-co-butadiene), poly(butadiene), poly(styrene-co-butadiene-co-isoprene) and mixtures thereof.

Reinforcing fillers may include both organic and inorganic fillers. Organic fillers include, but are not limited to carbon black, and inorganic fillers include, but are not limited to, silica, alumina, aluminum hydroxide, and magnesium hydroxide. Reinforcing fillers are typically employed in an amount from about 1 to about 100 parts by weight per 100 parts by weight rubber (phr), and preferably from about 20 to about 80 parts by weight phr, and more preferably from about 40 to about 80 parts by weight phr based on the total weight of all reinforcing fillers employed. Typically, when an inorganic filler is used, it is used in combination with organic fillers. In these embodiments, the total amount of reinforcing filler will include from about 30 to about 99 parts by weight inorganic filler and 1 to about 70 parts by weight organic filler, based on 100 parts by weight total filler. More preferably, the total filler will include from about 50 to about 95 parts by weight inorganic filler and from about 5 to about 50 parts by weight organic filler based on 100 parts by weight filler.

Carbon blacks may include any commonly available carbon black, but those having a surface area (EMSA) of at least 20 $m^2/g$, and more preferably at least 35 $m^2/g$ up to 200 $m^2/g$ or higher, are preferred. Surface area values used in this application are those determined by ASTM test D-1765 by using the cetyltrimethyl-ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, preferably about 100 to about 250 $m^2/g$, and more preferably about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Typically, a coupling agent is added when silica is used. One coupling agent conventionally used is bis-[3(triethoxysilyl) propyl]-tetrasulfide, which is commercially available under the tradename SI69 (Degussa, Inc.; New York, N.Y.). Additional coupling agents may include bis(3-(triethoxysilyl)propyl) trisulfide, bis(3-(triethoxysilyl)propyl) disulfide, 3-mercaptopropyltriethoxysilane, bis(3-(trimethoxysilyl) propyl) tetrasulfide, bis(3-(trimethoxysilyl)propyl) trisulfide, bis(3-(trimethoxysilyl)propyl) disulfide, 3-mercaptopropyltrimethoxysilane, 3-(trimethoxysilyl)propyl)diethylthiocarbamyl tetrasulfide, and 3-(trimethoxysilyl)propyl)benzothiazyl tetrasulfide. These agents are typically employed in an amount from about 1 to about 20 phr, and more preferably from about 3 to about 15 phr. Advantageously, less coupling agent is required when the functionalized polymers of this invention, which include a silane functionality, are employed.

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, $2^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The polyolefin additives are preferably added during preparation of the initial masterbatch. Once this initial masterbatch is prepared, the vulcanizing agents are blended into the composition. The composition can then be processed into tire components according to ordinary tire manufacturing techniques including standard rubber curing techniques. Rubber compounding techniques and the additives employed therein are generally known as disclose in *The Compounding and Vulcanization of Rubber*, by Stevens in RUBBER TECHNOLOGY SECOND EDITION (1973 Van Nostrand Reihold Company). Pneumatic tires can be made according to U.S. Pat. Nos. 5,866,171; 5,876,527; 5,931,211; and 5,971,046, which are incorporated herein by reference.

The functionalized polymers of this invention can also be used in the manufacture of hoses, belts, shoe soles, window seals, other seals, vibration damping rubber, and other industrial products.

In order to demonstrate the practice of the present invention, the following examples have been prepared and tested as described in the Examples Section disclosed hereinbelow. The examples should not, however, be viewed as limiting the scope of the invention. The claims will serve to define the invention.

EXAMPLES

Examples 1-4

A catalyst was prepared by mixing 0.5 g of 1,3-butadiene monomer in hexanes, 0.32 mmol of neodymium neodecanoate in hexanes, 31.7 mmol of methylaluminoxane in toluene, and 6.67 mmol of diisobutylaluminum hydride in hexanes within a dried and $N_2$ purged bottle equipped with a rubber septum. After two minutes of contact, 1.27 mmol of diethylaluminum chloride in hexanes was added to the mixture. The mixture was then aged at room temperature for about 15 minutes.

Polybutadiene polymer was prepared by mixing the catalyst solution prepared above with 611 g of 1,3-butadiene monomer in about 3,459 g of hexanes at 25° C. within a two-gallon stainless steel reactor equipped with an agitator and a jacket for temperature control. This mixture was agitated for about 10 minutes at 24° C. The jacket temperature was increased to 72° C. and agitation continued for 33 minutes, after which the jacket temperature was lowered to 70° C.

The polymer cement was sampled into separate dried and N$_2$-purged bottles and identified as Examples 1-4.

4, 4'-bis(N,N-diethylamino)benzophenone (DEAB) was added as a toluene solution to the respective samples in an amount and at a temperature as set forth in Table I. The functionalizing agent was allowed to react for the time specified, quenched with a small amount of isopropyl alcohol and 2,6-di-t-butyl 4-methyl phenol (BHT) in hexanes, and then the polymer was isolated by coagulation in isopropyl alcohol and successive drum drying. Comparative Example 4 was determined to have a 93 percent cis structure by using FTIR analysis.

Table I sets forth the MooneyViscosity (ML 1+4 @ 100° C.), the Mooney relaxation to 20% torque (T-80), the number average molecular weight ($M_n$), the weight average molecular weight ($M_w$), and the molecular weight distribution as determined by GPC that was universally calibrated for polybutadiene based on polystyrene. Bound rubber was measured by immersing finely shredded uncured rubber specimens into toluene at room temperature. After 40 hours, the composition was filtered and bound rubber was calculated from the weight of the dried sample compared to other insoluble ingredients. Also, the samples were tested to determine tan δ at 50° C. (frequency at 31.4 rad/s and 3% strain).

The percent functionality of the polymer was obtained from the area ratios of UB and RI chromatograms and the number average molecular weight of the polymer ($M_n$) obtained by GPC by using universal calibration for polystyrene and high cis butadiene based on polystyrene standards. The following three assumptions were made: (1) the UV absorbance of an end-functional group on a n-butyllithium (n-BuLi) initiated polymer was the same as the UV absorbance of the end-functional group on a lanthanide-catalyzed polymer, (2) n-BuLi initiated polymers are 100% functionalized, and (3) the area ratio of UV/RI is a linear function of the inverse of the $M_n$ of the polymer. Pursuant to the method employed, a calibration curve of UV/RI area ratio (A) and $M_n$ of polymers that were initiated with n-BuLi and terminated with the same imine compound was established according to the following formula: $A = a(1/M_n) + b$ where $A_{(BuLi, endgroup)} = A_{(BuLi, polymer)} - A_{(BuLi-backbone)} = (a_{(polymer)} - a_{(backbone)})(1/M_n) + (b_{(polymer)} - b_{(backbone)})$. Parameters a and b were obtained by least square linear fitting of GPC data of n-BuLi initiated and imine terminated polymers and n-BuLi initiated and alcohol terminated polymers, with 3 different molecular weights. The percent functionalities (F) of unknown polymers initiated by lanthanide catalysts were obtained from GPC data of the functionalized, unknown polymer and the corresponding unfunctionalized (base) polymer according to the following formula: $F = A_{(unknown, endgroup, M)} / A_{(BuLi, endgroup, M)} = (A_{(unknown, polymer, M)} - A_{(unknown, backbone, M)}) / [(a_{(polymer)} - a_{(backbone)})(1/M) + (b_{(polymer)} - b_{(backbone)})]$.

Examples 5-7

A catalyst was prepared by mixing 0.5 g of 1,3-butadiene monomer in hexanes, 0.275 mmol of neodymium neodecanoate in hexanes, 27.5 mmol of methylaluminoxane in toluene, and 5.77 mmol of diisobutylaluminum hydride in hexanes within a dried and N$_2$ purged bottle equipped with a rubber septum. After two minutes of contact, 1.10 mmol of diethylaluminum chloride in hexanes was added to the mixture. The mixture was then aged at room temperature for about 15 minutes.

Polybutadiene polymer was prepared as in Examples 1-4, except that the jacket temperature was initially set at 26° C., and was increased to 82° C. The polymer cement was sampled into separate dried and N$_2$-purged bottles and identified as Examples 5-7. Examples 6 and 7 were functionalized with DEAB, which was charged to the bottles in toluene solution, as set forth in Table I. Comparative Example 5 was not functionalized with DEAB.

Examples 8-10

A catalyst was prepared by mixing 0.5 g of 1,3-butadiene monomer in hexanes, 0.317 mmol of neodymium neodecanoate in hexanes, 31.7 mmol of methylaluminoxane in toluene, and 6.67 mmol of diisobutylaluminum hydride in hexanes within a dried and N$_2$ purged bottle equipped with a rubber septum. After two minutes of contact, 1.27 mmol of diethylaluminum chloride in hexanes was added to the mixture. The mixture was then aged at room temperature for about 15 minutes.

Polybutadiene polymer was prepared as in Examples 1-4, except that the jacket temperature was initially set at 27° C., and was increased to 82° C. The polymer cement was sampled into separate dried and N$_2$-purged bottles and identified as Examples 8-10. Examples 9 and 10 were functionalized with DMI, which was charged to the bottles in neat form, as set forth in Table I. Comparative Example 8 was not functionalized with DMI.

TABLE I

|  | 1 | 2 | 3 | 4 | 5 | 6 | 7 | 8 | 9 | 10 |
|---|---|---|---|---|---|---|---|---|---|---|
| Functionalizing Agent | None | DEAB | DEAB | None | None | DEAB | DEAB | None | DMI | DMI |
| Amount of functionalizing agent (eq/Nd) | — | 25 | 50 | — | — | 25 | 50 | — | 25 | 50 |
| Reaction Temp (° C.) | — | 50 | 50 | — | — | 50 | 50 | — | 50 | 50 |
| Reaction Time (min) | — | 180 | 180 | — | — | 180 | 180 | — | 180 | 180 |
| ML1 + 4 @ 100° C. | 26.6 | 30.3 | 29.5 | 28.7 | 44.1 | 48.4 | 47.0 | 32 | 35.7 | 34.2 |
| T-80 (s) | 3.3 | 3.3 | 3.3 | 3.7 | 4.0 | 3.7 | 4.0 | 3.3 | 3.7 | 3.7 |
| Mn (kg/mol) | 121 | 123 | 123 | 121 | 140 | 139 | 144 | 122 | 122 | 124 |
| Mw (kg/mol) | 235 | 238 | 237 | 237 | 274 | 279 | 279 | 240 | 246 | 245 |
| Mw/Mn | 1.9 | 1.9 | 1.9 | 1.9 | 2.0 | 2.0 | 1.9 | 2.0 | 2.0 | 2.0 |
| % functionality | 0.0 | 64 | 68 | 0 | 0 | 58 | 67 | 0 | n/a | n/a |

Examples 11-18

Certain of the resulting polymers were individually compounded into rubber formulations with either silica (Nipsil VN3™; Nippon Silica; Japan) or carbon black (N339) as a filler. Namely, an initial masterbatch was blended within an internal mixer at an initial temperature of about 110° C. for about 3.5 minutes. The masterbatch was allowed to cool and then re-milled within the same internal mixer for about 2 minutes. Then, a cure system was added while the compound was continually processed within the internal mixer at a temperature of about 80° C. for about 1 minute. The compounding recipes that were employed are set forth in Tables II and III.

TABLE II

COMPOUNDING RECIPE WITH SILICA

| Ingredient | Parts per Hundred Rubber |
|---|---|
| Elastomer | 100 |
| Aromatic Oil | 10 |
| Silica | 50 |
| Stearic Acid | 2 |
| Antioxidant | 1 |
| Masterbatch Total | 163 |
| Zinc Oxide | 2.5 |
| Sulfur | .03 |
| Accelerators | 2.5 |
| Total | 171.5 |

TABLE III

COMPOUNDING RECIPE WITH CARBON BLACK

| Ingredient | Parts per Hundred Rubber |
|---|---|
| Elastomer | 100 |
| Aromatic Oil | 10 |
| Paraffin Oil | 1.5 |
| Carbon Black | 50 |

TABLE III-continued

COMPOUNDING RECIPE WITH CARBON BLACK

| Ingredient | Parts per Hundred Rubber |
|---|---|
| Stearic Acid | 2 |
| Antioxidant | 1 |
| Masterbatch Total | 164.5 |
| Zinc Oxide | 2 |
| Sulfur | 1.3 |
| Accelerators | 1.2 |
| Total | 169.0 |

Once compounded, each formulation was press cured at about 145° C. for about 33 minutes. The cured samples were then analyzed to determine tensile strength at break and elongation at break according to JIS-K6301. Also, the samples were tested to determine tan δ and G' at 50° C. (frequency at 31.4 rad/s and 3% strain), as well as Lambourne wear.

The results of testing the vulcanizates filled with carbon black are set forth in Table IV, and the results of testing the vulcanizates filled with silica are set forth in Table V. The data in Table IV, except for Mooney Viscosity (ML1+4@100° C.), has been indexed to the vulcanizates prepared by using polymer Sample 1, and the data in Table V, except for Mooney Viscosity, has been indexed to the vulcanizates prepared by using polymer Sample 8. The polymer sample labeled A is a weighted average between sample polymers 1 and 11 calculated to provide Mooney Viscosity (ML1+4@100° C.) of about 44.

TABLE IV

| | Polymer No | | | | | | |
|---|---|---|---|---|---|---|---|
| | 1 | 4 | A (aproximation from 1 and 11) | 7 | 8 | 9 | 11 |
| Agent | none | DEAB | none | DEAB | none | DMI | none |
| Amount (eq/Nd) | — | 50 | — | 50 | — | 25 | — |
| RawMV | 26.6 | 29.5 | 44.1 | 47 | 32.3 | 35.7 | 54.6 |
| Raw T-80 | 3.3 | 3.3 | 4 | 4 | 3.3 | 3.7 | 4 |
| Compound Mooney | 46.4 | 62.5 | 69.65 | 81.4 | 51.3 | 54.7 | 83.6 |
| Bound Rubber (index) | 100 | 275 | 113 | 254 | 101 | 99 | 121 |
| M300 (RT) (index) | 100 | 111 | 110 | 112 | 101 | 106 | 116 |
| Tb (RT) (index) | 100 | 116 | 108 | 109 | 110 | 101 | 112 |
| Eb (RT) (index) | 100 | 104 | 98 | 95 | 105 | 96 | 96 |
| M300 (100 C.) (index) | 100 | 102 | 108 | 117 | 108 | 112 | 113 |
| Tb (100 C.) (index) | 100 | 104 | 101 | 107 | 106 | 116 | 101 |
| Eb (100 C.) (index) | 100 | 100 | 94 | 92 | 99 | 104 | 91 |
| 3% tanδ @50 C. (index, smaller is better) | 100 | 78 | 91 | 75 | 103 | 97 | 86 |

TABLE V

| | Polymer # | | | |
|---|---|---|---|---|
| | 8 | 10 | 1 | 3 |
| Agent | none | DMI | none | DEAB |
| Amount (eq) | — | 50 | — | 25 |
| RawMV | 32.3 | 34.2 | 26.6 | 30.3 |
| Raw T-80 | 3.3 | 3.7 | 3.3 | 3.3 |
| Compound Mooney | 115.1 | 118.0 | 110.5 | 120.4 |
| Bound Rubber (index) | 100 | 113 | 98 | 117 |
| M300 (RT) (index) | 100 | 94 | 86 | 94 |
| Tb (RT) (index) | 100 | 100 | 95 | 111 |
| Eb (RT) (index) | 100 | 104 | 106 | 109 |
| M300 (100 C.) (index) | 100 | 98 | 84 | 92 |
| Tb (100 C.) (index) | 100 | 107 | 90 | 107 |
| Eb (100 C.) (index) | 100 | 108 | 109 | 115 |
| G' @10%–G' @3% (smaller is better) | 100 | 68 | 102 | 82 |

Various modifications and alterations that do not depart from the scope and spirit of this invention will become apparent to those skilled in the art. This invention is not to be duly limited to the illustrative embodiments set forth herein.

What is claim is:

1. A method for preparing a functionalized polymer comprising the steps of:
preparing a pseudo-living polymer by polymerizing conjugated diene monomer with a lanthanide-based catalyst wherein the lanthanide-based catalyst comprises (a) a lanthanide compound, (b) an alkyl aluminoxane, and (c) a source of halogen; and
reacting the pseudo-living polymer with a functionalizing agent defined by the formula:

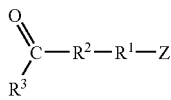

(II)

where $R^1$ is a divalent bond or divalent organic group comprising from 0 to about 20 carbon atoms, $R^2$ is a divalent organic group or trivalent organic group in the case where $R^2$ combines with $R^3$ to form a cyclic group, $R^3$ is a hydrogen atom, a monovalent organic group, or, in the case where $R^3$ combines with $R^2$, $R^3$ may be a divalent organic group, and Z is selected from the group consisting of N,N-disubstituted aminophenyl groups, cyclic amino groups, imine groups, amide groups, isocyanate groups, isothiocyanate groups, and epoxy groups, with the proviso that $R^1$, $R^2$, $R^3$, and Z are substituents that will not protonate a pseudo-living polymer.

2. The method of claim 1, where Z is an N,N-disubstituted aminophenyl group.

3. The method of claim 2, wherein (b) comprises an alkyl aluminoxane or a mixture of an alkyl aluminoxane and a trialkylaluminum, dialkylaluminum hydride, or alkylaluminum dihydride.

4. The method of claim 2, wherein the pseudo-living polymer is prepared in the absence of phosphorus-containing compounds.

5. The method of claim 1, where the functionalizing agent comprises 4,4'-bis(N,N-dimethylamino)benzophenone, 4,4'-bis(N,N-diethylamino)benzophenone, 4-(N,N-dimethylamino)benzophenone, 4-(N,N-diethylamino)benzophenone, (4-N,N-dimethylaminophenyl)methyl ethyl ketone, 4,4'-bis(1-hexamethyleneiminomethyl) benzophenone, 4,4'-bis(1-pyrolidinomethyl) benzophenone, 4-(1-hexamethyleneiminomethyl) benzophenone, 4-(1-pyrolidinomethyl) benzophenone, or (4-(1-hexamethyleneimino)phenyl)methyl ethyl ketone.

6. The method of claim 1, where the functionalizing agent comprises 4-(N,N-dimethylamino)benzaldehyde, 4-(N,N-diethylamino)benzaldehyde, 4-(1-hexamethyleneiminomethyl) benzaldehyde, or 4-(1-pyrolidinomethyl) benzaldehyde.

7. The method of claim 6, prepared in the absence of aluminoxane compounds.

8. The method of claim 1, wherein the lanthanide-based catalyst comprises (a) neodymium neodecanoate; (b) methylaluminoxane and diisobutylaluminum hydride; and (c) diethylaluminum chloride.

9. The method of claim 1, wherein the conjugated diene monomer is 1,3-butadiene.

10. The method of claim 9, wherein the functionalizing agent is 4,4'bis(N,N-diethylamino)benzophenone.

11. The method of claim 9, wherein the functionalizing agent is 4,4'bis(N,N-dimethylamino)benzophenone.

12. A method for preparing a functionalized polymer comprising the steps of:
preparing a pseudo-living polymer by polymerizing conjugated diene monomer with a lanthanide-based catalyst, wherein the lanthanide-based catalyst comprises (a) a lanthanide compound, (b) an alkyl aluminoxane or a mixture of an alkyl aluminoxane and a trialkylaluminum, dialkylaluminum hydride, or alkylaluminum dihydride, and (c) a source of halogen; and
reacting the pseudo-living polymer with a functionalizing agent defined by the formula:

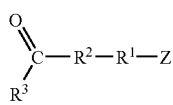

(II)

where $R^1$ is a divalent bond or divalent organic group comprising from 0 to about 20 carbon atoms, $R^2$ is a divalent organic group or trivalent organic group in the case where $R^2$ combines with $R^3$ to form a cyclic group, $R^3$ is a hydrogen atom, a monovalent organic group, or, in the case where $R^3$ combines with $R^2$, $R^3$ may be a divalent organic group, and Z is a substituent that will react or interact with silica or carbon black reinforcing fillers.

13. The method of claim 12, wherein the lanthanide-based catalyst comprises (a) neodymium neodecanoate; (b) methylaluminoxane and diisobutylaluminum hydride; and (c) diethylaluminum chloride.

14. The method of claim 12, wherein the conjugated diene monomer is 1,3-butadiene.

15. The method of claim 14, wherein the functionalizing agent is 4,4'bis(N,N-diethylamino)benzophenone.

16. The method of claim 14, wherein the functionalizing agent is 4,4'bis(N,N-dimethylamino)benzophenone.

* * * * *

UNITED STATES PATENT AND TRADEMARK OFFICE
CERTIFICATE OF CORRECTION

PATENT NO. : 7,642,322 B2
APPLICATION NO. : 11/216559
DATED : January 5, 2010
INVENTOR(S) : Ozawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Sixteenth Day of November, 2010

David J. Kappos
*Director of the United States Patent and Trademark Office*